United States Patent
Pugh-Gottlieb

[19]

[11] Patent Number: 5,971,303
[45] Date of Patent: Oct. 26, 1999

[54] WASTE ROUTER RECYCLING SYSTEM

[76] Inventor: Margaret Pugh-Gottlieb, 136 Whaley St., Freeport, N.Y. 11520

[21] Appl. No.: 09/046,204

[22] Filed: Mar. 23, 1998

[51] Int. Cl.[6] .................................................. B02C 21/00
[52] U.S. Cl. .................................... 241/46.013; 241/101.2
[58] Field of Search .............................. 4/DIG. 4; 71/14, 71/12, 64.04, 901; 210/173, 174; 241/101.2, 46.013

[56] References Cited

U.S. PATENT DOCUMENTS

| | | | |
|---|---|---|---|
| 3,823,879 | 7/1974 | Johnson | 241/46.013 |
| 3,954,605 | 5/1976 | Davies et al. . | |
| 4,050,917 | 9/1977 | Varro . | |
| 4,210,528 | 7/1980 | Coviello et al. . | |
| 4,344,826 | 8/1982 | Smith . | |
| 4,761,235 | 8/1988 | Haentjens | 4/DIG. 4 |
| 4,812,237 | 3/1989 | Cawley et al. . | |
| 5,082,486 | 1/1992 | Glogowski . | |
| 5,127,587 | 7/1992 | Johnson | 241/46.013 |
| 5,405,780 | 4/1995 | Hamilton . | |
| 5,441,155 | 8/1995 | Eldar . | |
| 5,522,913 | 6/1996 | Peguy . | |
| 5,534,042 | 7/1996 | Tsuchida . | |
| 5,535,455 | 7/1996 | Liu . | |
| 5,551,969 | 9/1996 | Wright . | |
| 5,587,320 | 12/1996 | Shindo et al. . | |
| 5,588,534 | 12/1996 | Harel . | |
| 5,676,319 | 10/1997 | Stiggins et al. . | |

*Primary Examiner*—Mark Rosenbaum
*Attorney, Agent, or Firm*—Michael I. Kroll

[57] ABSTRACT

An apparatus for routing, treating and recycling refuse includes a first valve connected between the drain and the main sewer line for receiving water and refuse flowing through the drain. A compost pile and water separation tank are connected to a second valve which is connected to receive water and refuse from the first valve. The first valve operates between a first position directing the water and refuse received thereby to the main sewer line and a second position directing the water and refuse received thereby to the second valve. The second valve operates between a first position directing the water and refuse received from the first valve to the compost pile and a second position for directing the water and refuse received from the first valve to the separation tank. The water received by the separation tank is stored in a water storage tank for recycling and later use while the refuse directed to the compost pile and separation tank is collected for later use. The apparatus for routing, treating and recycling refuse is controlled by a control panel positioned adjacent the drain and connected to control the first and second valves. The apparatus may also include a third valve for further routing the water from the separation tank to a hose for supplying the a water to a garden or to another facility such as a toilet or sink.

1 Claim, 7 Drawing Sheets

WASTE ROUTER RECYCLING SYSTEM

BACKGROUND OF THE INVENTION

1. Field of the Invention

The present invention relates generally to treatment of refuse and waste products and, more specifically, to an apparatus for separating and routing water and refuse passing through a drain and selectively processed by a garbage disposal unit to any of a number of facilities local to the source of the refuse through the use of a manually activated control panel redirecting the refuse from the conventional sewer lines.

2. Description of the Prior Art

Numerous devices for routing, treating and recycling waste products have been provided in the prior art. For example, U.S. Pat. Nos. 3,954,605; 4,050,917; 4,210,528; 4,344,826; 4,812,237; 5,082,486; 5,405,780; 5,441,155; 5,522,913; 5,534,042; 5,535,455; 5,551,969; 5,587,320; 5,588,534 and 5,676,319 all are illustrative of such prior art. While these units may be suitable for the particular purpose to which they address, they would not be as suitable for the purposes of the present invention as heretofore described.

U.S. Pat. No. 3.954,605

Inventor: Robert John Davies et al.

Issued: May 4, 1976

This invention relates to the treatment of wastes including sewage, solids which may include both combustible and incombustible solids, and optionally waste fuel such as oil. The invention provides a method and plant for treating wastes in which solids are converted to an incineratable form which, in a first embodiment, is incinerated with the sewage solids obtained by separating the sewage into a sewage solids component and a clarified waste water component together with additional fuel if necessary, at least a part of said clarified waste water component being optionally incinerated to control temperatures during incineration, and any remaining waste water being disinfected. In a second embodiment the incineratable material is incinerated with the sewage together with the waste fuel and additional fuel if necessary. The invention has the advantage that it is applicable to all types of waste, and the products of incineration are deodorized waste gases, incombustible and sterile ash, and in one embodiment additionally disinfected waste water, thus avoiding pollution problems.

U.S. Pat. No. 4,050,917

Inventor: Stephan Varro

Issued: Sep. 27, 1977

A process for composting waste material by controlling the amount of aeration, the pH value of the moisture content and the temperature of the material during composting. The resulting material has a pH value of approximately 7.3 and a moisture content within the range of 10–30%. The carbon-nitrogen ratio is also controlled to achieve a relative stable composted material at the output product.

U.S. Pat. No. 4,210,528

Inventor: Allan J. Coviello

Issued: Jul. 1, 1980

A closed loop waste treatment and water recycling system that includes a delivery system, an anoxic reactor, an aerobic digestion chamber, a filtering system, an adsorption system, a disinfecting system and a water return system. The delivery system includes one or more flush-type toilets and urinals which receive flush water from the water return system and deliver the toilet and urinal waste and flush water to the anoxic reactor. The anoxic reactor contains bacteria which utilizes organics in the toilet waste to convert oxidized nitrogen compounds, such as nitrates, to nitrogen gas, produce bicarbonates and other products. The bacteria, in accomplishing this, lower the organic load on subsequent processes. A denitrified liquid containing bicarbonates and reduced amounts of organics is transferred to the aerobic digestion chamber, which contains biologically active solids and in which organic carbon, organic nitrogen, and ammonium compounds are oxidized by bacteria to obtain a liquid product high in concentration of oxidized nitrogen compounds such as nitrates and low soluble carbonaceous compounds. This liquid product is filtered, treated with activated carbon, disinfected, and subsequently returned to the toilets and urinals as colorless, clear and odorless flush water containing oxidized nitrogen compounds such as nitrates. The oxidized nitrogen compounds produced in the aerobic digestion chamber insure prevention of odors in the system. As a result of the effective management of nitrogen in the system, it can be made of reasonable size, undesirable odors are avoided and a desired slower buildup of solids in the system is achieved.

U.S. Pat. No. 4,344,826

Inventor: Verity C. Smith

Issued: Aug. 17, 1982

The waste water output of an RO unit in a distillation system is conveyed to a still's condenser cooling coil to minimize water requirements of the system. A portion of the heated water from the condenser, in one embodiment, is circulated to the RO unit inlet, where a temperature for the RO inlet water by mixing feed water and condenser output water in the desired proportions.

U.S. Pat. No. 4,812,237

Inventor: William E. Cawley et al.

Issued: Mar. 14, 1989

A closed water purification and recycle system processes domestic wastewater to produce potable water for cooking, drinking and dishwashing and water suitable for general household use, such as washing clothes and personal hygiene. The system consists of septic tanks, a biological sand filter, an ultrafilter, a disinfection unit, pumps, valves, water quality and quantity sensors to monitor and control the process. The system also includes an incinerator toilet to eliminate the need for toilet flush water. Water for cooking, drinking and dishwashing is produced by a still using some of the recycled water for feed. The quality of the recycled water is monitored to assure the product water is suitable for the intended uses. Water thus produced is stored until reused. The system will be automatically shut down if the final product water quality does not meet specifications. Blowdown containing concentrated salts from the still is evaporated and incinerated in the incinerator toilet to maintain a satisfactory concentration of salts in the recycled water. The system equipment is designed and sized to allow unattended operation between inspections, scheduled periodically, at which time routine maintenance is performed and makeup water is added to the system to replace water lost to evaporation.

U.S. Pat. No. 5,082,486

Inventor: Mark E. Glogowski

Issued: Jan. 21, 1992

A process for converting municipal garbage into organic compost material is described. In the first step of this process, a mixture of cellulosic refuse material and earthworms is provided. In the second step of this process, the mixture of refuse material and earthworms is maintained at a moisture content of from about 45 to about 92 weight percent and a temperature of from about 0 to about 54 degrees centigrade for from about 3 to about 8 months.

U.S. Pat. No. 5405,780

Inventor: John M. Hamilton, Jr.

Issued: Apr. 11, 1995

The composting of waste material in a batch mode is accomplished by microbiological aerobic activity in a closed cylindrical vessel. The batch composting facility comprises bottom aeration and an agitation auger mechanism to ensure both aerobic and homogeneous composting conditions.

U.S. Pat. No. 5,441,155

Inventor: Dor Eldar

Issued: Aug. 15, 1995

A method for processing domestic garbage includes the steps of sorting the garbage into two or more classes and placing each class into a unified domestic container. The container is divided into a respective number of compartments. The containers are transferred to a garbage dump site and dismembered into their compartments. Then, each compartment is transferred to its respective garbage class treatment location.

U.S. Pat. No. 5,522.913

Inventor: Guy Peguy

Issued: Jun. 4, 1996

An apparatus for transforining an input garbage moisture into separate fermented and non-fermented output products has a fermentation stage for depositing an input garbage mixture into non-compacted swathes to allow fermentation of the fermentable, organic waste materials therein, an input stage for loading the garbage mixture, and at least one grinder/separator stage having a grinder for grinding the garbage mixture into smaller particles and a separator with a screen of a selected mesh size for separating ground waste particles up to the selected mesh size as a fermented output product, and conveying the remainder of the particles to a reject output as a non-fermented output product. Fermentation of the input garbage mixture allows for organic maturation of the fermentable, organic waste materials in the mixture, as well as softening and rendering the fermented materials more susceptible to being broken up into small particles in the grinder/separator stage. The input stage is equipped with a hopper, a pulsed air dryer, and a magnetic drum for picking off ferrous materials. In a preferred configuration, the grinder has three rotating axles in triangular arrangement carrying chains mounted in rows thereon with hardened tips on their free ends. Successive grinder/separator stages are used to reduce the particles to the desired output size, with the separator of each subsequent stage having a progressively finer mesh size. A pulverizer/grinder stage pulverizes the reject output (mostly plastics) into smaller particles. The pulverized particles can be compressed and heat molded to form fence parts, paving blocks, road bedding materials, etc. A modified version of the grinder is used for shredding old tires into rubber particles that can be compression molded into useable items. The invention includes the related processes and processed products.

U.S. Pat. No. 5,534,042

Inventor: Yuji Tsuchida

Issued: Jul. 9, 1996

This invention relates to a method and apparatus for forming a compost product from organic matter having high water content: the method involving (1) holding organic matter with a large amount of water in a treatment tank for one to three hours while providing a supply of air, heating to not more than 60° C. And agitating and grinding the organic matter so that the matter is reduced to a rice porridge state and aerobic fermentation occurs, extracting generated gas and water vapor to the outside of the tank, thereby dehydrating and drying the organic matter to form a fermentation and decomposition product having a water content of not more than 65%, (2) holding the fermentation and decomposition product for one to six hours at a temperature between 60° C. and 100° C. To thermally decompose the fermentation and decomposition product, extracting generated gas and water vapor to the outside of the tank, thereby dehydrating and drying the fermentation and decomposition product having a water content of not more than 45%, and (3) drying the thermal decomposition product for one to six hours at a temperature between 100° C. And 135° C. To sterilize the thermal decomposition product, extracting generated gas and water vapor to the outside of the tank, thereby dehydrating and drying the thermal decomposition product to form the compost product having a water content of not more than 30%; and an apparatus capable of accomplishing the above method.

U.S. Pat. No. 5,535,455

Inventor: Morgan C. Liu

Issued: Jul. 16, 1996

A sink strainer for a garbage disposal unit includes a strainer unit, a seat and a mounting flange. The strainer unit includes a handle, a strainer member and a plug member. The plug member has a platform and a surrounding wall depending from the platform on which multiple slope guides are located. The seat includes a limiter located at a lower portion of the seat, a stopping surface protruding from and surrounding a middle portion of the seat, a snapping portion at a bottom of the seat. The mounting flange is provided at a top end with a flange portion and at a bottom end with a mounting portion. The sink strainer may further include a decorative flange having a flange portion and a snapping portion which are dimensioned and configured to abut on, and be engaged with, the flange portion and top snapping portion of the seat.

U.S. Pat. No. 5,551,969

Inventor: James Wright

Issued: Sep. 3, 1996

A method of continuous composting is carried out in a train of composting trays in an elongate enclosed tunnel.

Garbage is deposited into the composting tunnel via a blending trough in which blending augers blend the garbage. The trough then tilts to empty the garbage into an inlet in the top surface of the tunnel to fill an upstream one of the trays. A ram shunts the trays stepwise through the tunnel. The tracks may be U-channels, the webs of which are connected to tunnel sidewalls. The trays rest on one of the legs of the U and the other leg of the U extends over the edge of the tray to protect it from being fouled by garbage. During passage of the trays through the tunnel, the garbage may be mixed by mixers for loosening and aeration of the garbage. Such mixing may have directional components in both longitudinal and transverse direction of the tunnel. Water may be added immediately downstream of the mixing for the purpose of optimizing composting conditions. The water may be added into spray curtains from spaced apart spray bars above and immediately downstream of the mixers. The invention also includes a continuous compostor having a blending trough for blending the garbage and for tilting so that the blended garbage falls into an upstream tray.

U.S. Pat. No. 5,587.320

Inventor: Yasuhiro Shindo et al.

Issued: Dec. 24, 1996

An apparatus for processing solid organic waste by crushing and/or agitating and fermenting the waste includes a solid organic matter processing device including a processing vessel provided with a crushing unit for receiving and crushing the solid organic waste and a processing unit for agitating and fermenting the crushed waste, a heat exchanger disposed outside the solid organic matter processing device which heat exchanger condenses vapor in a gas supplied from the processing vessel of the solid organic matter processing device to thereby change the vapor to liquid and to discharge the liquid, and gas circulation pipes for providing a gas circulation path through which the inside of the processing vessel of the solid organic matter processing device is operably connected to the heat exchanger and through which a gas in the processing vessel of the solid organic matter processing device is supplied into the heat exchanger and almost all of which gas processed in the heat exchanger is returned to the solid organic matter processing device while a portion of the gas processed in the heat exchanger or a portion of the gas supplied from the processing vessel of the solid organic matter processing device is discharged to the outside of the apparatus.

U.S. Pat. No. 5,588,534

Inventor: Denis Harel

Issued: Dec. 31, 1996

There is provided a method and apparatus for processing domestic garbage wherein the garbage is debagged and placed on a series of vibrating conveyors which are tilted with respect to the horizontal in a direction substantially normal to the direction of conveyor operation whereby the garbage is separated according to the density/hardness of the material. The apparatus can include various accessory devices including electro magnets, vacuum devices and blowing devices to assist in the separation of the material.

U.S. Pat. No. 5,676,319

Inventor: Kendy Lee Stiggins et al.

Issued: Oct. 14, 1997

The invention is a garbage disposal that includes a dishwasher drain connection to allow water and waste to enter the disposal from a dishwasher, a water input port also to allow water to enter the disposal, a valve associated with the water input port to block the flow of water through the water input port until the valve is actuated, and a switch assembly to actuate both the disposal and the valve. In one embodiment of the invention a coupler accepts both a dishwater drain hose and a water supply hose, so that the dishwater drain connection acts as the water input port. Another embodiment of the invention includes a coupler adapted to be installed on and modify existing disposals according to the invention. The invention also includes a method of modifying garbage disposals according to the invention.

SUMMARY OF THE PRESENT INVENTION

The present invention relates generally to treatment of refuse and waste products and, more specifically, to an apparatus for separating and routing water and refuse passing through a drain and selectively processed by a garbage disposal unit to any of a number of facilities local to the source of the refuse through the use of a manually activated control panel redirecting the refuse from the conventional sewer lines.

A primary object of the present invention is to provide an apparatus for routing, treating and recycling refuse that will overcome the shortcomings of prior art devices.

Another object of the present invention is to provide an apparatus for routing, treating and recycling refuse which is able to alleviate the burden present on municipal waste treatment facilities.

A further object of the present invention is to provide an apparatus for routing, treating and recycling refuse which is able to add organic matter to the soil by way of a compost pile.

An additional object of the present invention is to provide an apparatus for routing, treating and recycling refuse which is able to modify the presently existing sewer system to selectively redirect waste to recycling and storage facilities located locally to the source of the refuse.

A further object of the present invention is to provide an apparatus for routing, treating and recycling refuse including a control panel for manually controlling the route to be taken by selected waste products.

A yet further object of the present invention is to provide an apparatus for routing, treating and recycling refuse including a valve device connected to both the drain of a sink and the control panel for directing the selected waste products to the desired location.

A further object of the present invention is to an apparatus for routing, treating and recycling refuse including a waste tank having a device for catching and holding any solid material directed thereto for later disposal and a separation tank for storing any water separated from the solid waste material for later use such as for watering a garden or a water supply for a toilet.

Another object of the present invention is to provide an apparatus for routing, treating and recycling refuse that is simple and easy to use.

A still further object of the present invention is to provide an apparatus for routing, treating and recycling refuse that is economical in cost to manufacture.

Additional objects of the present invention will appear as the description proceeds.

An apparatus for routing, treating and recycling refise includes a first valve connected between the drain and the main sewer line for receiving water and refuse flowing through the drain. A compost pile and water separation tank are connected to a second valve which is connected to receive water and refuse from the first valve. The first valve operates between a first position directing the water and refuse received thereby to the main sewer line and a second position directing the water and refuse received thereby to the second valve. The second valve operates between a first position directing the water and refuse received from the first valve to the compost pile and a second position for directing the water and refuse received from the first valve to the separation tank. The water received by the separation tank is stored in a water storage tank for recycling and later use while the refuse directed to the compost pile and separation tank is collected for later use. The apparatus for routing, treating and recycling reftise is controlled by a control panel positioned adjacent the drain and connected to control the first and second valves.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
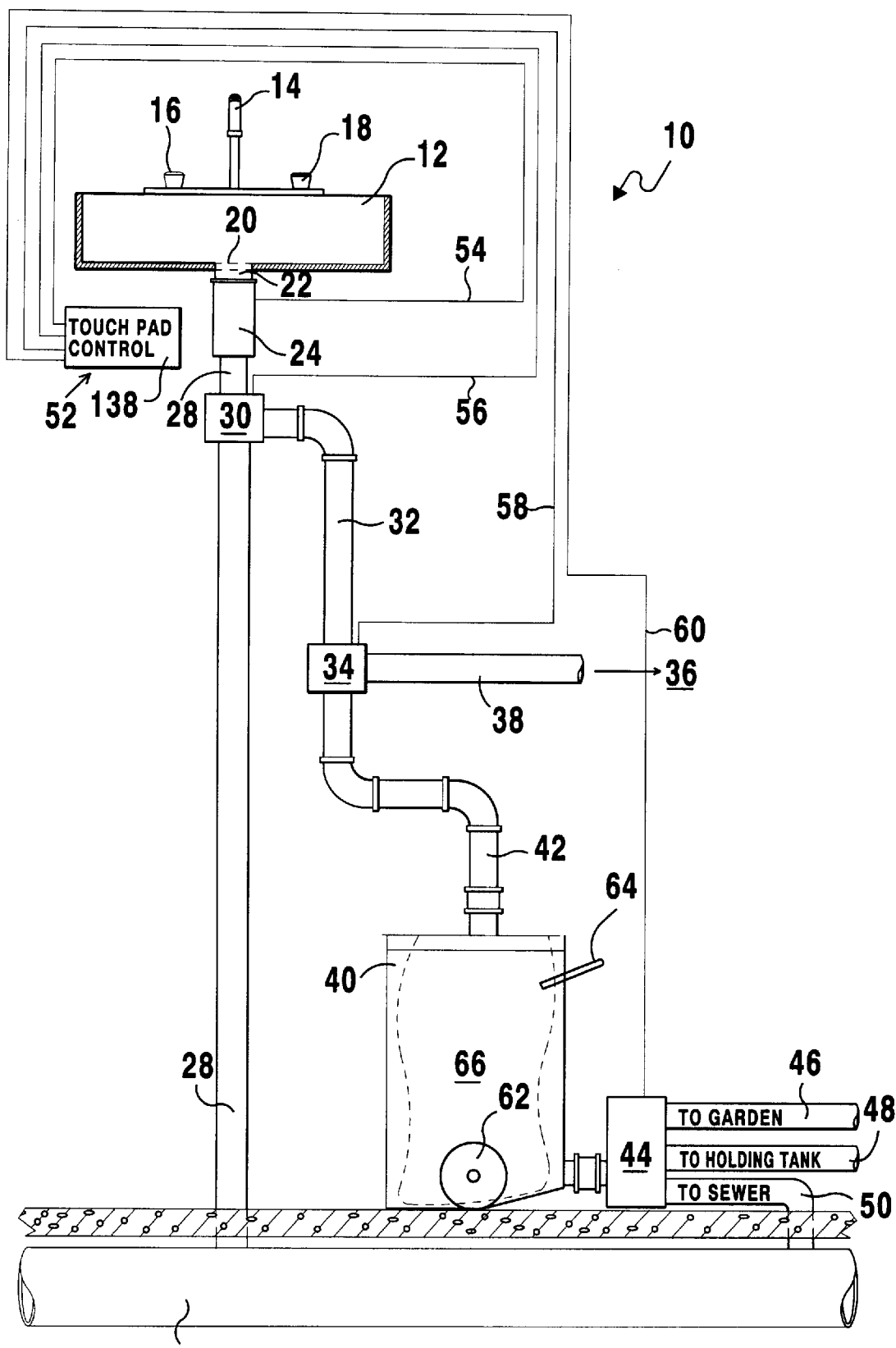
FIG. 1 is a side partial cross-sectional view of the apparatus for routing, treating and recycling refuse of the present invention.

Turning now descriptively to the drawings, in which similar reference characters denote similar elements throughout the several views, the Figures illustrate the apparatus for routing, treating and recycling refuse of the present invention. With regard to the reference numerals used, the following numbering is used throughout the various drawing figures.

10 apparatus for routing, treating and recycling refuse of the present invention
12 sink
14 faucet
16 hot water knob
18 cold water knob
20 drain
22 drain pipe
24 disposal
26 sewer line
28 sewer pipe
30 first valve
32 alternate disposal pipe
34 second valve
36 compost pile
38 pipe to compost pile
40 separator tank
42 pipe to separator tank
44 third valve
46 pipe to garden
48 pipe to holding tank
50 pipe to sewer line
52 control panel
54 first control line to disposal
56 second control line to first valve
58 third control line to second valve
60 fourth control line to third valve
62 wheel on separator tank
64 handle on separator tank
66 perforated bag within separator tank
68 ON button
70 LED positioned on ON button
72 OFF button
74 LED positioned on OFF button
76 disposal button
78 LED positioned on disposal button
88 compost pile button
90 LED positioned on compost pile button
96 garden water button
98 LED positioned on garden water button
100 tank water button
102 LED positioned on tank water button
104 sewer water button
106 LED positioned on sewer water button
108 second embodiment of the apparatus for routing, treating and recycling refise
110 separation tank
111 connection pipe between first valve and separation tank
112 removable compost container
114 screen
115 external above ground storage tank
116 internal storage tank
117 connection pipe between separation tank and second valve
118 pipe between second valve and internal/external storage tank
120 pipe between second valve and waste line
122 base of internal storage tank
124 exit pipe for external storage tank
125 exit pipe for internal storage tank
126 pump
128 pipe leading from pump
130 toilet
132 second faucet 134 pipe between second faucet and pump
136 cabinet
138 control panel
140 buttons on the control panel
142 ON button
144 LED positioned on ON button
146 OFF button
148 LED positioned on OFIF button
150 disposal button
152 LED positioned on disposal button
162 tank water button
164 LED positioned on tank water button
166 sewer water button
168 LED positioned on sewer water button
170 manual shut off valve
172 manual shut off valve
174 hot water pipe
176 cold water pipe

DETAILED DESCRIPTION OF THE PREFERRED EMBODIMENT

Turning now descriptively to the drawings, in which similar reference characters denote similar elements throughout the several views, FIGS. 1–7 illustrate the apparatus for routing, treating and recycling refuse of the present invention. The apparatus for routing, treating and recycling refuse is indicated generally by the numeral 10.

Figure 2:
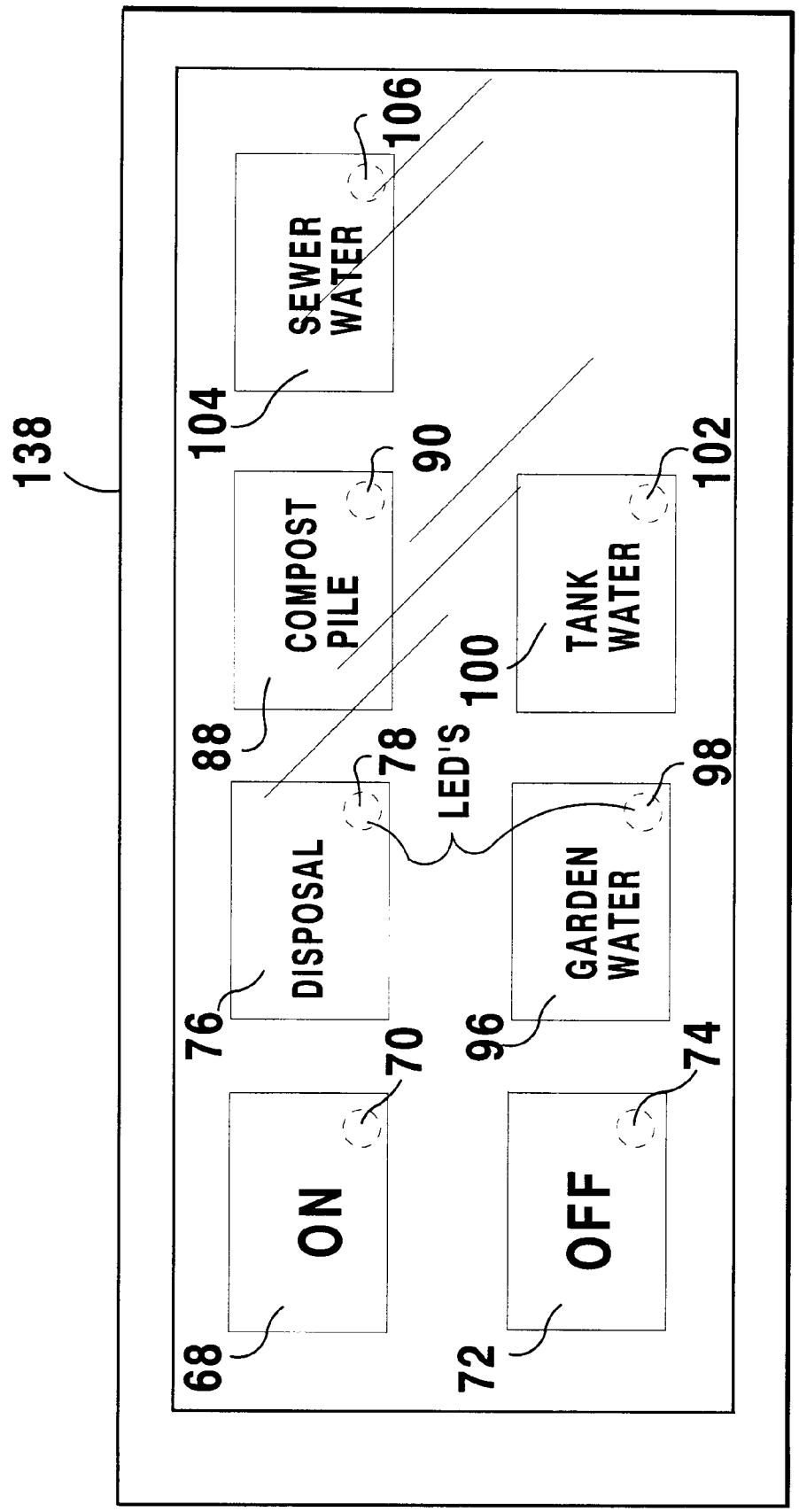
FIG. 2 is a front elevational view of a touch control pad used with the apparatus for routing, treating and recycling refuse of the present invention.

A first embodiment of the apparatus for routing, treating and recycling refuse 10 of the present invention is clearly illustrated in numerous views and sections in FIGS. 1 and 2. FIG. 1 illustrates the first embodiment of the apparatus for routing, treating and recycling refuse 10 connected to a sink 12. The sink 12 is connected to receive a supply of water from a faucet 14 including a hot water knob 16 and a cold water knob 18. The hot water knob 16 controls the flow of hot water through the faucet 14 and the cold water knob 18 controls the flow of cold water through the faucet 14. A drain 20 is located at a base of the sink 12 and leads to a drain pipe 22 and a waste disposal unit 24. The waste disposal unit 24 acts to grind solid refuse for transporting through the sewage system with water supplied through the faucet 14. The waste disposal unit 24 is connected to the main sewer line 26 via a connector pipe 28.

The apparatus for routing, treating and recycling refuse 10 of the present invention includes a first valve 30 connected along the connector pipe 28 for redirecting the water and waste passing through the waste disposal unit 24 to an alternate disposal pipe 32. The first valve will normally direct the water, waste and refuse to the main sewer line 26 unless activated. The alternate disposal pipe 32 includes a second valve 34 at an opposing end thereof. The second valve 34 connects the alternate disposal pipe 32 to either a compost pile 36 through a first pipe 38 or a separator tank 40 through a second pipe 42. The separator tank 40 is connected to a third valve 44 for supplying water transported to the separator tank 40 to either the garden 46 for use in performing tasks such as watering the lawn, to a holding tank 48 for storage and later use or to flow back through a pipe 50 to the sewer system 26.

A control panel 52 is connected to the disposal unit 24 for manually controlling operation of the disposal unit 24 via a first control line 54. A second control line 56 connects the control panel 52 to the first valve 30. The control panel 52 is also connected to the second and third valves 34 and 44 via third and fourth control lines 58 and 60, respectively.

The separator tank 40 is mobile and includes at least one wheel 62 on either side thereof and a handle 64 for moving the separator tank 40 to any desired location. Positioned within the separator tank 40 is a perforated bag 66 for retaining solid waste transported to the separator tank 40 therein. The perforated bag 66 is able to be removed from the separator tank 40 whereby the waste and refuse retained therein can be removed and the perforated bag 66 replaced for storing additional waste and refuse.

The user will control the path of disposal for any waste, refuse and water within the sink 12 through the control panel 52. The control panel 52 is illustrated in FIG. 2. Without specific control of the disposal path by the user the waste, refuse and water will be directed to the main sewer line 26. The control panel 52 includes an ON button 68 with an LED 70 thereon. The LED 70 will illuminate when the ON button 68 is activated to indicate that apparatus for routing, treating and recycling refuse 10 is in use. The control panel 52 also includes an OFF button 72 with an LED 74 thereon. The LED 74 will illuminate when the OFF button 72 is activated to indicate that apparatus for routing, treating and recycling refuse 10 is not in use.

The apparatus for routing, treating and recycling refuse 10 may be controlled to grind waste and refuse deposited through the drain 20 by activating the disposal unit 24 independently of the operation of the valves 30 and 34 for activating thoapparatus for routing, treating and recycling refuse 10. The control panel 52 includes a disposal button 76 with an LED 78 thereon. The LED 78 will illuminate when the disposal button 76 is activated to indicate that the waste disposal unit 24 is in use to grind any waste and refuse passing therethrough.

The user is also able to control the direction in which the waste, refuse and water deposited through the drain 20 will flow. When the LED 74 on the OFF button 72 is lit, the control panel 52 is deactivated and any water passing through the drain will flow to the main sewer line 26. Any refuse passing through the drain 20 will be held in the disposal unit 24 until the disposal unit 24 is activated to grind the waste and refuse. The main sewer line 26 is the default for the apparatus for routing, treating and recycling refuse 10 and thus whenever any water, waste or refuse flows through the drain 20 while the apparatus for routing, treating and recycling refuse 10 is off, it will flow to the main sewer line 26. When the ON button 68 is activated the LED 70 thereon will illuminate to indicate that the apparatus for routing, treating and recycling refuse 10 is now on. This will activate the first valve 30 to redirect any water, waste or refuse flowing through the drain 20 from the main sewer line 26 and to the apparatus for routing, treating and recycling refuse 10.

The control panel 52 also is connected to control the operation of the second valve through the control line 58. For controlling operation of the second valve 34, the control panel includes a compost pile button 88 with an LED 90 thereon. The LED 90 on the compost pile button 88 will illuminate when the compost pile button 90 is activated indicating the second valve 34 is activated to direct the waste, refuse and water to the compost pile 36. In all other instances, the water, waste and refuse flowing through the first valve 30 will be directed by the second valve 34 to the separator tank 40 by default and held therein. The compost pile 36 is used to deliver organic matter ground up by the disposal unit 24 to the soil.

The control panel 52 is also connected to control operation of the third valve 44 and includes a garden water button 96 with an LED 98 thereon, a tank water button 100 with an LED 102 thereon and a sewer water button 104 with an LED 106 thereon. The LED 98 on the garden water button 96 will illuminate when the garden water button 96 is activated indicating the first, second and third valves 30, 34 and 44 are activated to direct the waste, refuse and water deposited through the drain 20 to supply water for the garden 46. The LED 102 on the tank water button 100 will illuminate when the tank water button 100 is activated indicating the first, second and third valves 30, 34 and 44 are activated to direct the waste, refuse and water deposited through the drain 20 to supply water to the storage tank for later use in different water requiring activities such as flushing a toilet. The LED 106 on the sewer water button 104 will illuminate when the sewer water button 104 is activated to indicate that the first, second and third valves 30, 34 and 44 are activated to direct the waste, refuse and water deposited through the drain 20 to the main sewer pipe 26.

Thus, the control buttons on the control panel 52 are activated by the user to direct any waste, refuse and water within the sink and passing through the drain to either the sewer line 26 or to the apparatus for routing, treating and recycling refuse 10. By directing the waste, refuse and water to the apparatus for routing, treating and recycling refuse 10 the burden of processing all refuse and water passing through a drain 20 and into the sewage pipes 26 is eased as the amounts can be limited and recycled instead of being transported to a main sewage treatment plant for processing.

An alternate embodiment of the apparatus for routing, treating and recycling refuse 10 of the present invention which may be completely installed below the sink 12 is illustrated in FIGS. 3–7. Identical numerals will be used to indicate similar elements found in the embodiment of FIG. 1.

Figure 3:
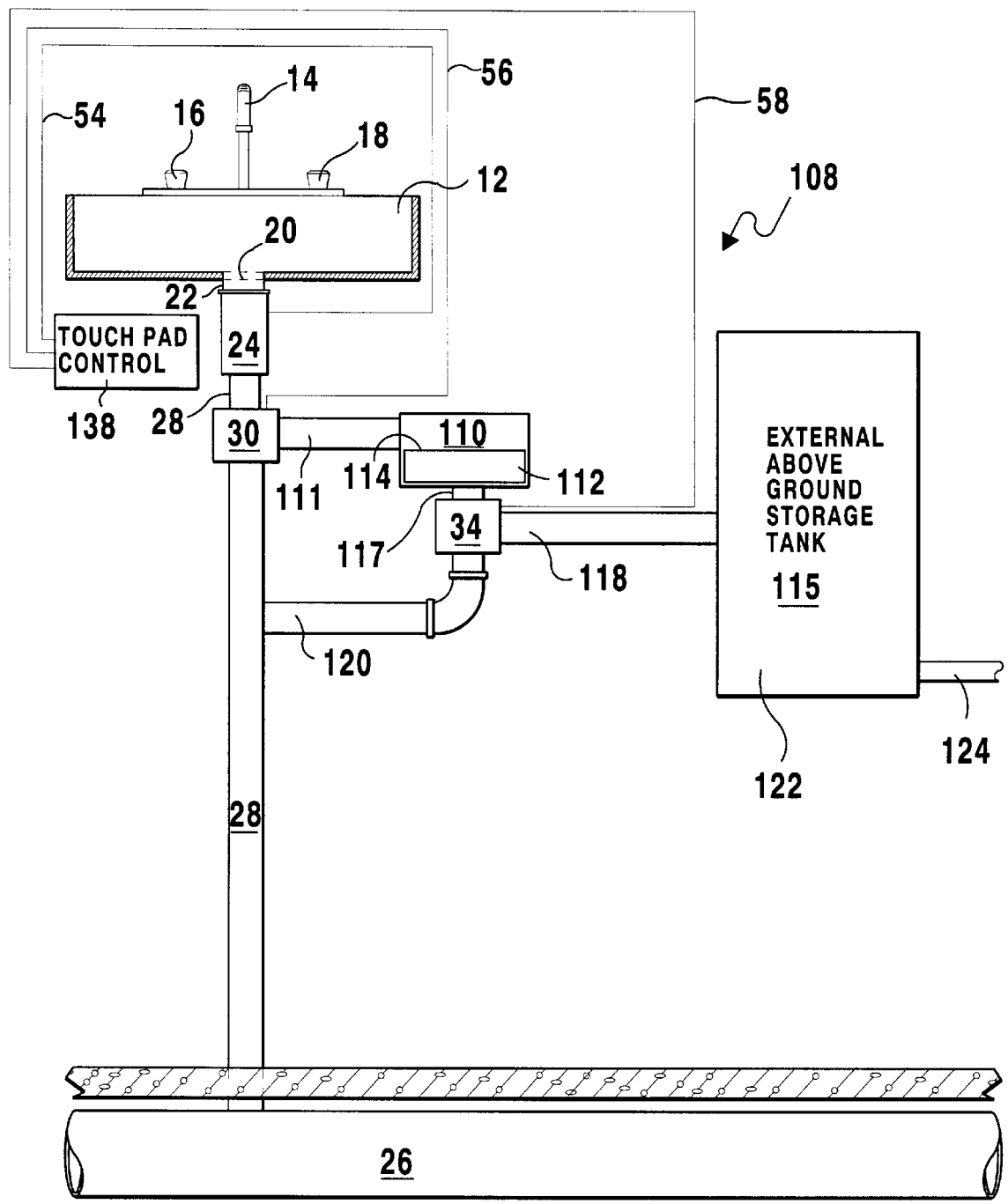
FIG. 3 is a side partial cross-sectional view of a second embodiment of the apparatus for routing, treating and recycling refuse of the present invention for positioning under a sink.

The second embodiment of the apparatus for routing, treating and recycling refuse 108 is illustrated in FIG. 3 and is connected to the sink 12. The sink 12 includes a faucet 14, hot and cold water knobs 16 and 18 and a drain 20. The drain 20 leads to a drain pipe 22 and from there to the disposal unit 24. At an exit of the disposal unit 24 is located the first valve 30. The first valve 30 directs the waste, refuse and water to either the main sewer line 26 through the waste line 28 or to a separator tank 110 through a connection pipe 111.

The separator tank includes a removable compost container 112 and a screen 114 positioned thereon for collecting waste flowing into the separator tank 112 and allowing water to pass therethrough. The screen 114 and the compost container 112 are able to be removed from the separation tank 110 in order to be cleaned and the waste and refuse collected thereby removed and properly disposed of or recycled. An exit of the separation tank 110 is connected to the second valve 34 through a pipe 117.

The second valve 34 is connected to direct the water from the separation tank 110 which flows through the screen 114 and the removable container 112 to either an external above ground storage tank 115 via a pipe 118 or to the waste line 28 through a pipe 120. At a base 122 of the external above ground storage tank 116 is a gravity flow exit passage 124 for receiving water stored within the external above ground storage tank 116 and delivering the water to either the garden or to be recycled and used within the household. The gravity flow exit passage 124 is positioned at the base of the external above ground storage tank 116 to take advantage of the effects of gravity to deliver the water to the desired destination.

Figure 6:
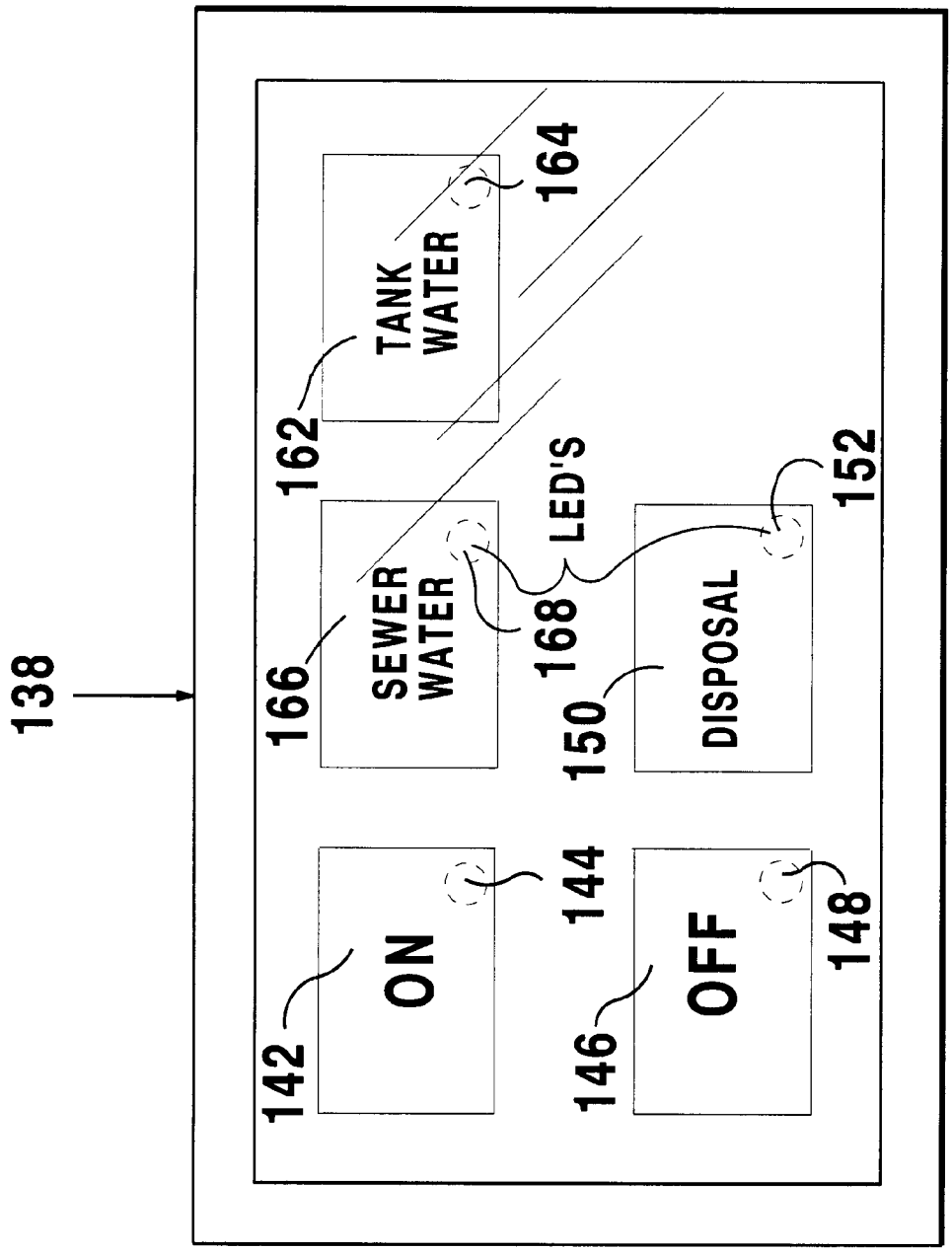
FIG. 6 is an exploded view of the touch control panel for use with the apparatus for routing, treating and recycling waste of the present invention illustrated in FIG. 5.

A control panel 138 similar to that used with the first embodiment illustrated in FIGS. 1 and 2 is connected to control the flow of waste, refuse and water through the apparatus for routing, treating and recycling refuse 108. The control panel used with the second embodiment is illustrated in FIG. 6. The control panel 138 is connected to the disposal unit 24 for manually controlling operation of the disposal unit 24 via the control line 54. The control line 56 connects the control panel 138 to the first valve 30. The control panel 138 is also connected to the second valve 34 via the third control line 58.

Figure 4:
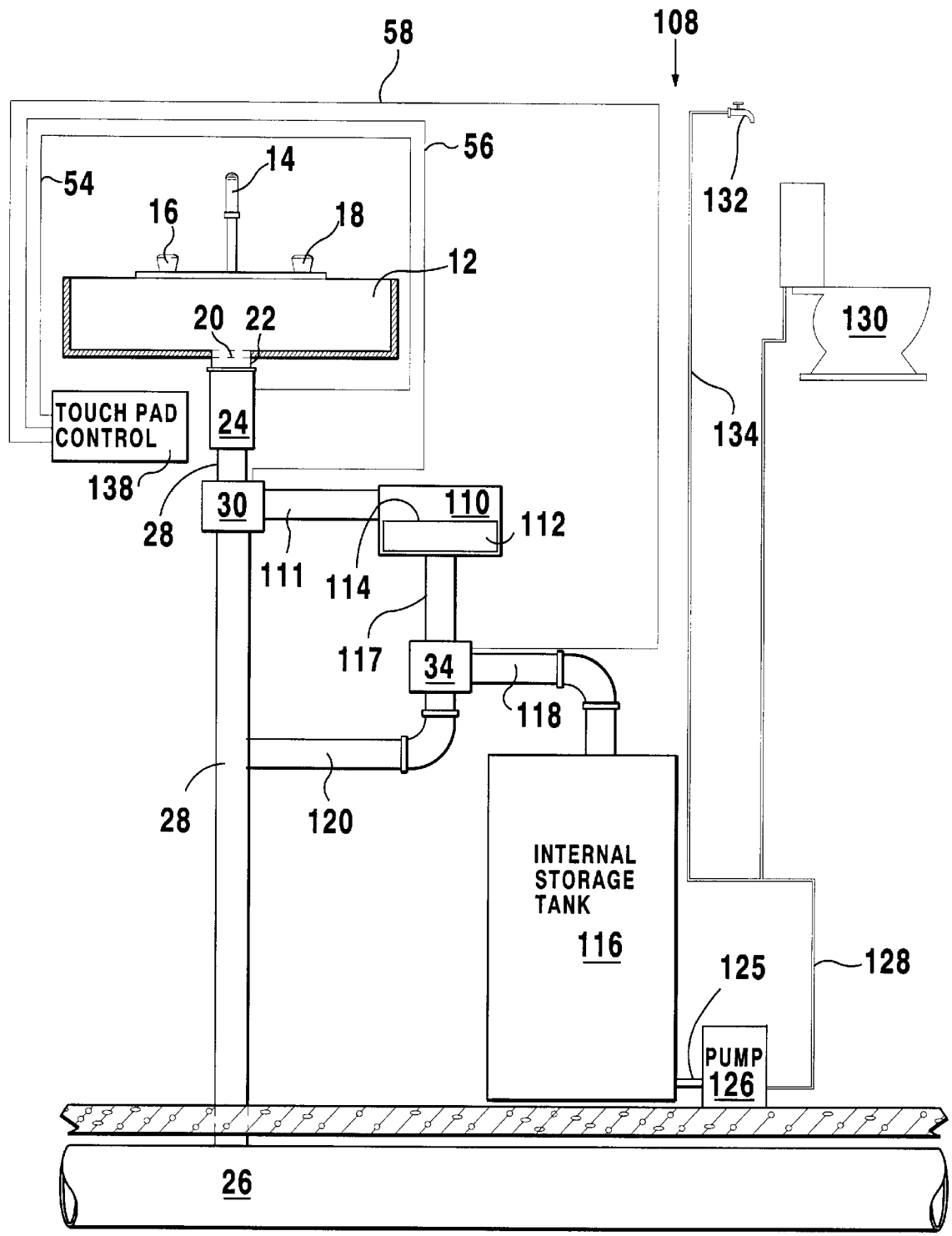
FIG. 4 is a side partial cross-sectional view of the second embodiment of the apparatus for routing, treating and recycling refuse of the present invention shown in FIG. 3 including a connection for supplying water within the storage tank to a toilet and another sink.

FIG. 4 illustrates the second embodiment of the apparatus for routing, treating and recycling refuse 108 of the present invention as shown in FIG. 3 including a connection with both a second faucet 132 and a toilet 130. In this figure, a pump 126 is connected to the exit passage 125. The pump 126 is connected to a supply pipe 128 which connects to a toilet 130 and a second external faucet 132.

Water passing from the faucet 14 through the drain 20 and disposal 24 to the first valve 30 is directed to flow through the separation tank 110. The separation tank 110 separates the waste and refuse flowing with the water and delivers the separated water to either the main sewer line 26 or to the storage tank 116 by way of the second valve 34. The water stored in the storage tank 116 is retained there until needed. When a user either turns on the faucet 132 or flushes the toilet 130 connected thereto the pump 126 pulls water from the storage tank 116 and supplies it to either or both of the desired facilities. The water flowing through the drain 20 is thus recycled for future use and removed from burdening the sewage system.

Figure 5:
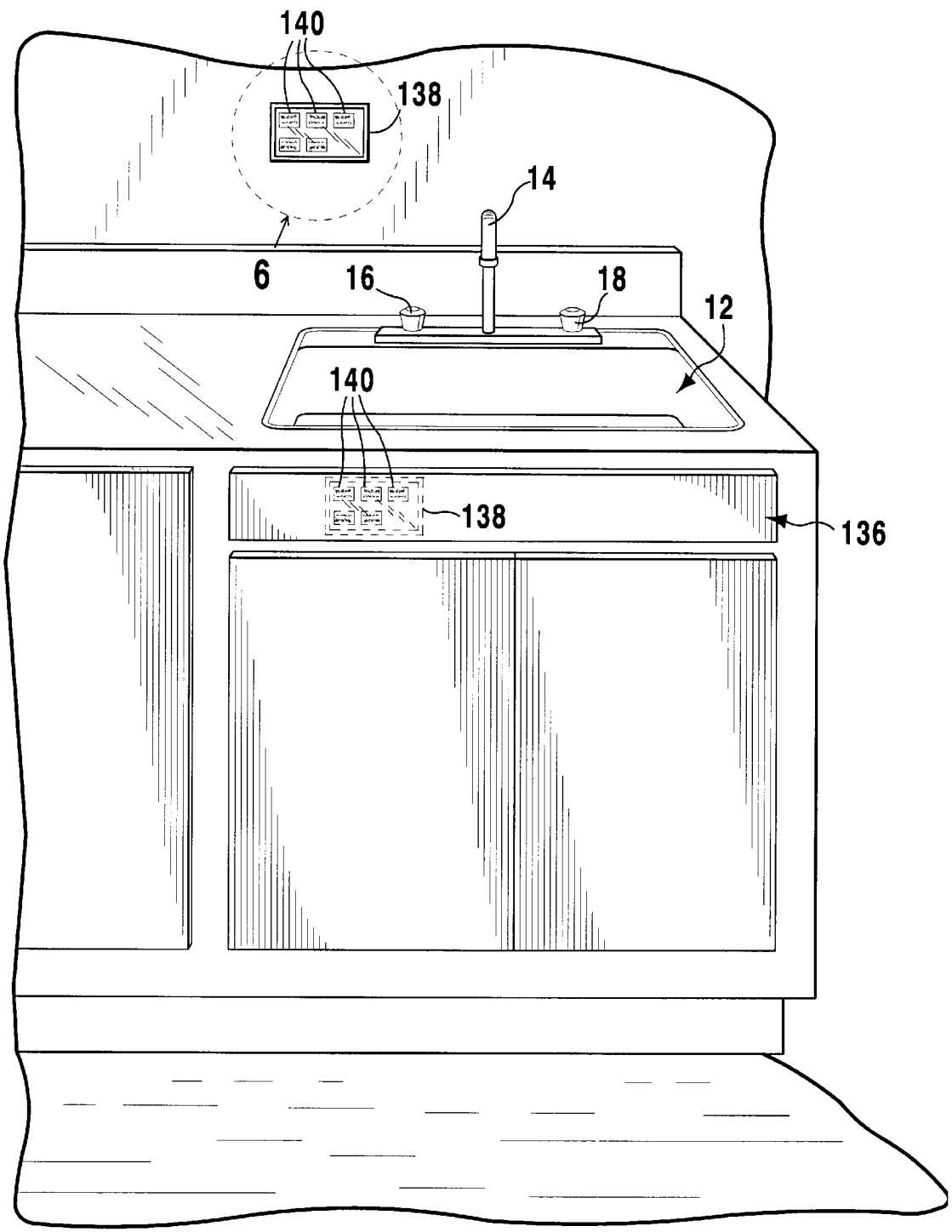
FIG. 5 is a front perspective view of a touch control pad for use with the apparatus for routing, treating and recycling refuse of the present invention for installation on a facing of a cabinet in front of the sink.

FIG. 5 illustrates a cabinet 136 within which the apparatus for routing, treating and recycling refuse 10 or 108 is positioned. Positioned on a wall adjacent the sink 12 is the control pad 52 or 138 used to control the direction of flow of waste, refuse and water passing through the drain of the sink 12. Alternatively, the control pad 52 or 138 may be positioned on a side of the cabinet 136 as shown in dashed lines in FIGS. 5 and 7 or at any location near to the drain and convenient for the user. The positioning of the control pad 52 or 138 in the figures is for purposes of illustration only and not meant to limit the scope of the present invention. The control pad 52 or 138 includes a plurality of buttons 140 positioned thereon for use in controlling the operation of the valves of the apparatus for routing, treating and recycling refuse 10 or 108.

The control pad 138 for the second embodiment of the apparatus for routing, treating and recycling refuse 108 is illustrated more clearly in FIG. 6. As can be seen from this figure, the control pad 138 includes a plurality of buttons 140. The user will control the path of disposal for any waste, refuse and water within the sink 12 through the control panel 138. Without specific control of the disposal path by the user the waste, refuse and water will be directed to the sewer system 26. The control panel 138 includes an ON button 142 with an LED 144 thereon. The LED 144 will illuminate when the ON button 142 is activated to indicate that apparatus for routing, treating and recycling refuse 108 is in use and will direct water, waste and refuse deposited through the drain 20 and through the first valve 30 to the separation tank 110. The control panel 138 also includes an OFF button 146 with an LED 148 thereon. The LED 148 will illuminate when the OFF button 146 is activated to indicate that apparatus for routing, treating and recycling refuse 108 is not in use and water, waste and refuse will be directed to the main sewer line 26.

When the ON button 142 is activated the user may control the apparatus for routing, treating and recycling refuse 108 to grind waste and refuse deposited through the drain 20 by activating the disposal unit 24. The control panel 138 includes a disposal button 150 with an LED 152 thereon. The LED 152 will illuminate when the disposal button 150 is activated to indicate that the waste disposal unit 24 is in use to grind any waste and refuse passing therethrough.

The control panel 138 also is connected to control the operation of the second valve 34 through the control line 58. For controlling operation of the second valve 34, the control panel 138 includes a tank water button 162 with an LED 164 thereon and a sewer water button 166 with an LED 168 thereon. The LED 164 on the tank water button 162 will illuminate when the tank water button 162 is activated indicating the first and second valves 30 and 34 are activated to direct the waste, refuse and water deposited through the drain 20 to supply water to the storage tank 115 or 116 for later use in different water requiring activities such as flushing a toilet 130 or for a faucet 132. The LED 168 on the sewer water button 166 will illuminate when the sewer water button 166 is activated to indicate that the first and second valves 30 and 34 are activated to direct the waste, refuse and water deposited through the drain 20 to the main sewer pipe 26.

Thus, the control buttons 140 on the control panel 138 are activated by the user to direct any waste, refuse and water within the sink and passing through the drain to either the sewer line 26 or to the apparatus for routing, treating and recycling refuse 108. By directing the waste, refuse and water to the apparatus for routing, treating and recycling refuse 108 the burden of processing all refuse and water passing through a drain 20 and into the sewage pipes 26 is eased as the amounts can be limited and recycled instead of being transported to a main sewage treatment plant for processing.

Figure 7:
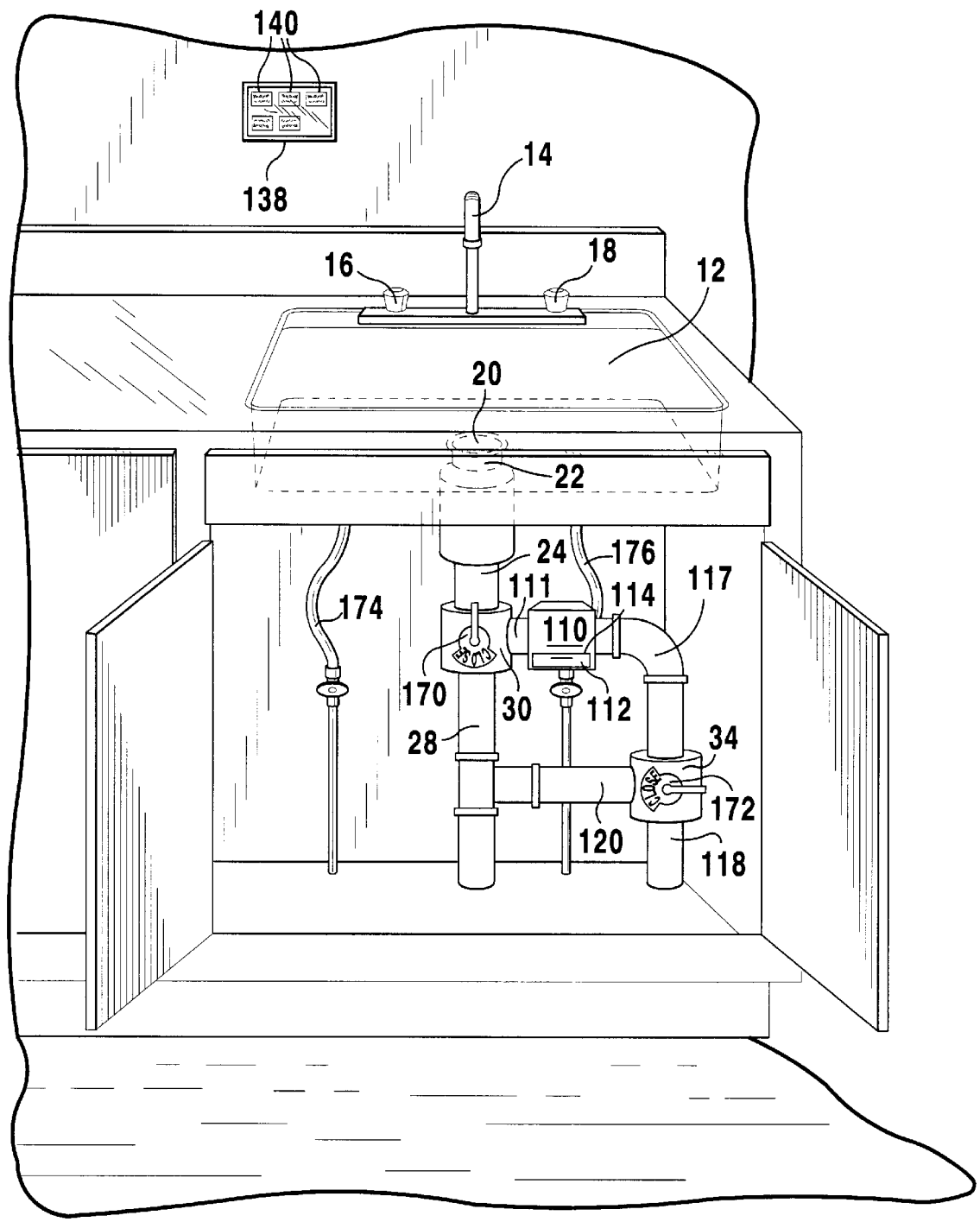
FIG. 7 is a front perspective view of the cabinets of FIG. 6 illustrating a smaller embodiment of a separation tank of the apparatus for routing, treating and recycling waste of the present invention.

FIG. 7 illustrates the apparatus for routing, treating and recycling refuse 108 positioned beneath a sink 12. As can be seen from this figure, the disposal unit 24 is connected below the drain 20 to receive any waste, refuse and water flowing therethrough. If the disposal unit 24 is not activated it acts simply as a conduit to the first valve 30. The first valve 30 directs the waste, refuse and water flowing thereto to either the sewer line through the pipe 28 or to the separator tank 110 based upon the controls entered into the control panel 138 by a user. As can be seen in this figure, the first valve includes a manual shut off/override valve 170. The shut off valve 170 is used to protect the system in the case of possible power loss to direct all water flowing through the drain during a power loss to the sewer system. All waste and refuse will be retained in the disposal unit 24 as it is prevented from operating due to the loss of power. The separation tank 110 is connected to the second valve 34 also including a manual shut off/override valve 172. The shut off valve 172 is also used to protect the system in the case of possible power loss and direct all waste, refuse and water flowing through the drain to the sewer system. The separation tank 110 is connected through the second valve 34 to deposit water into the storage tank 115 or 116 positioned outside of the cabinet 136. Also illustrated in this figure are the hot and cold water pipes 174 and 176 leading to the faucet 12.

The operation of the apparatus for routing, treating and recycling waste 10 of the present invention will now be described with reference to the figures. The present invention is primarily for adding organic matter to the compost pile for eventual delivery to the soil and alleviating the overburdened municipal waste treatment facilities by recycling water and organic plant material at the source of their original use. In order to install the apparatus for routing, treating and recycling waste 10 it will be necessary to modify the present waste disposal systems whereby all drains lead to the sewer lines and eventually to the treatment facility.

The apparatus for routing, treating and recycling waste 10 will be installed between the drains 20 at any sink 12 in the house or building and the main sewer pipe 26. The control panel is then installed adjacent the sink 12 and is connected to the disposal unit 24 and the first and second valves 30 and 34, respectively through the electrical connecting wires 56 and 58. If the embodiment of FIG. 1 is installed, the control panel 52 is connected to the third valve 44 by the electrical connecting wire 60. The separation tank 40 or 110 is then connected to either the second and/or third valve 34 and/or 44 and the water storage tank 115 or 116 is connected to the separation tank 40 or 110. The water storage tank 115 or 116 is located remote from the separation tank 40 or 110 and is connected thereto by a pipe 118. The water storage tank 115 or 116 is now connected to supply water to the garden or to another water facility such as a toilet or faucet and to the sewer line 26.

The apparatus for routing, treating and recycling waste 10 or 108 is now ready for use. When a user is running water in the sink 12 and depositing waste products and refuse down the drain, the ON button on the control panel 52 or 138 must be pressed to divert the water, waste and refuse into the apparatus for routing, treating and recycling waste 10 or 108. When the ON button is pressed the user can press other buttons on the control panel 52 or 138 to select the path for the water, waste and refuse to flow through the system. If the apparatus for routing, treating and recycling waste 10 or 108 is off then all water will be directed to the main sewer line 26. Pressing the ON button will turn the apparatus for routing, treating and recycling waste 10 or 108 on and control the first valve to divert the water and refuse through the apparatus for routing, treating and recycling waste 10 or 108. If the disposal button 76 or 150 is pressed, the disposal unit 24 will grind the refuse passing therethrough. If the compost button 88 is pressed, the second valve 34 will be controlled to direct the water and refuse to the compost pile 36 for later use. The organic and plant material ground by the disposal unit 24 and directed to the compost pile 36 will remain there for possible future use. The ground organic and plant material delivered to the separator tank 40 or 110 will be collected in the perforated bag 66 or in the removable compost container 112 for future use.

If the embodiment of FIG. 1 is utilized then the user may also activate a garden water button 96, a tank water button 100 or a sewer water button 104 to control the third valve 44 to direct the water in the separator tank 40 to the proper area, either to water the garden, to supply water to another facility such as a toilet or faucet or to supply the water to the main sewer line.

If the embodiment of FIGS. 3–7 is utilized, a pump 126 is connected to the storage tank 116 for supplying water from the storage tank 116 to another facility such as a toilet or faucet. The valves may also each include a manual override switch which will manually turn the valves off upon activation by the user. In this instance the valves will be controlled to direct any water or refuse directly to the main sewer line. This is useful in the event of a power outage as the apparatus for routing, treating and recycling waste 10 or 108 will be prevented from activation and any water directed therethrough may cause clogging of the pipes or the refuse to spoil in the storage tanks.

From the above description it can be seen that the apparatus for routing, treating and recycling refuse of the present invention is able to overcome the shortcomings of prior art devices by providing an apparatus for routing, treating and recycling refuse which is able to add organic matter to the soil by way of a compost pile and alleviate the burden present on municipal waste treatment facilities by modifying the presently existing sewer system to selectively redirect waste to recycling and storage facilities located locally to the source of the refuse. The apparatus for routing, treating and recycling refuse including a control panel for manually controlling the route to be taken by selected waste products and a valve device connected to both the drain of a sink and the control panel for directing the selected waste products to the desired location. The apparatus for routing, treating and recycling refuse also includes a waste tank having a device for catching and holding any solid material directed thereto for later disposal and a separation tank for storing any water separated from the solid waste material for later use such as in a garden or as a supply of toilet water. Furthermore, the apparatus for routing, treating and recycling refuse of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for routing, treating and recycling refuse flowing through and in combination with a drain and a main sewer line, said apparatus comprising:
    a) a first valve connected between the drain and the main sewer line for recieving water and refuse flowing through the drain, said drain including a disposal unit;
    b) a compost pile;
    c) a wheel and water seperation tank having a perforated bag removably positioned therein for retaining solid refuse;
    d) a second valve connected between said first valve and both said compost pile and said separation tank;
    e) a third valve connected to recieve water from said separation tank;
    f) said first valve operable between a position directing water and refuse directly to said main sewer line and a position directing water and refuse to said second valve;
    g) said second valve operable between a position directing water and refuse to said compost pile and a position directing water and refuse to said separation tank;
    h) said third valve operable between a position directing water to a pipe for delivering water to a garden, a position where water is delivered to a water holding tank, and a position where water is delivered to said main sewer line; and
    i) a control panel having buttons each with an LED for controlling said disposal unit and valves, a button for said first valve with an LED when lit to indicate that water and refuse are being delivered to said second valve, a button for said second valve with an LED when lit to indicate that the water and refuse are being delivered to said compost pile, and said third valve having separate buttons each with an LED to indicate when lit whether water from said separation tank is being directed to the main sewer line, the holding tank, or to said garden.

* * * * *